United States Patent
Eisenhauer et al.

(10) Patent No.: US 8,634,294 B2
(45) Date of Patent: Jan. 21, 2014

(54) DISCOVERY AND CAPABILITY EXCHANGE MANAGEMENT IN A VIRTUALIZED COMPUTING PLATFORM

(75) Inventors: Daniel G. Eisenhauer, Austin, TX (US); Charles S. Graham, Rochester, MN (US); Carol T. Machuca, Research Triangle Park, NC (US); Jeffrey W. Palm, Rochester, MN (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 13/438,450

(22) Filed: Apr. 3, 2012

(65) Prior Publication Data

US 2012/0188870 A1 Jul. 26, 2012

Related U.S. Application Data

(63) Continuation of application No. 12/464,567, filed on May 12, 2009, now Pat. No. 8,208,396.

(51) Int. Cl.
*H04L 1/00* (2006.01)
*H04L 12/26* (2006.01)

(52) U.S. Cl.
USPC .......... 370/230; 370/230.1; 370/231; 370/235

(58) Field of Classification Search
USPC ............ 370/254, 392; 709/223, 230; 710/105
See application file for complete search history.

(56) References Cited

U.S. PATENT DOCUMENTS

| | | | |
|---|---|---|---|
| 7,266,631 B2 | 9/2007 | Arndt et al. | |
| 7,496,790 B2 * | 2/2009 | Arndt et al. | 714/24 |
| 7,743,189 B2 | 6/2010 | Brown et al. | |
| 7,913,024 B2 | 3/2011 | Brown et al. | |
| 8,005,013 B2 | 8/2011 | Teisberg et al. | |
| 8,009,589 B2 * | 8/2011 | Burrow et al. | 370/254 |
| 8,144,582 B2 * | 3/2012 | Brown et al. | 370/230.1 |
| 2009/0037941 A1 | 2/2009 | Armstrong et al. | |
| 2009/0157926 A1 * | 6/2009 | Hashimoto | 710/105 |
| 2009/0249330 A1 | 10/2009 | Abercrombie et al. | |
| 2010/0146170 A1 * | 6/2010 | Brown et al. | 710/105 |
| 2010/0223397 A1 | 9/2010 | Elzur | |
| 2012/0188870 A1 * | 7/2012 | Eisenhauer et al. | 370/230 |

* cited by examiner

*Primary Examiner* — Ayaz Sheikh
*Assistant Examiner* — Blanche Wong
(74) *Attorney, Agent, or Firm* — Matthew C. Zehrer

(57) ABSTRACT

In various embodiments a traffic class manager is a resource within a virtualized computer systems trusted entity (e.g. a hypervisor, trusted partition, etc.) that maps requirements from a platform management and associated network capabilities onto an adapter (e.g. SR-IOV adapter, etc.) in order to appropriately allocate adapter and network resources to virtualized computer partitions. In various embodiments the traffic class manager defines network traffic classes that meet the objectives of a platform administrator based on the capabilities of the adapter and the network attached to the adapter ports. Once the traffic classes are defined, in various embodiments, the traffic class manager enforces the assignment of a traffic class to a virtual interface queue pair within a partition.

20 Claims, 6 Drawing Sheets

DISCOVERY AND CAPABILITY EXCHANGE MANAGEMENT IN A VIRTUALIZED COMPUTING PLATFORM

BACKGROUND OF THE INVENTION

1. Field of the Invention

Embodiments of this invention relate generally to field of computer processing and more specifically relate to discovery and capability exchange management in a virtualized computing environment.

2. Description of the Related Art

Within the computing industry, significant effort has been expended to increase the effective hardware resource utilization (i.e., application execution, etc.) through the use of virtualization technology. The Single Root I/O Virtualization and Sharing Specification (SR-IOV) defines extensions to the PCI Express (PCIe) specification suite to enable multiple System Images (SI) to share PCI hardware resources.

The generic platform configuration comprises a processor (i.e. general purpose, embedded, or specialized processing element, etc.), a memory (i.e. general purpose, embedded, etc.), a PCIe Root Complex (RC), a PCIe Root Port (RP) where each RP represents a separate hierarchy per the PCI Express Base Specification. Each hierarchy is referred to a single root hierarchy to delineate it from the multiple hierarchy technology defined within the Multi Root I/O Virtualization Specification, a PCIe Switch which provides I/O fan-out and connectivity, a PCIe Device or adapter (e.g., network adapter, storage adapter, etc.), a System Image or software such an operating system that is used to execute applications, trusted services, such as a shared or non-shared I/O device driver, a Single Root PCI Manager (SR-PCIM) Software that is responsible for the configuration of the SRIOV capability, management of Physical Functions and Virtual Functions, and processing of associated error events and overall device controls such as power management and hot-plug services, a Physical Function (PF) which is a PCIe Function (per the PCI Express Base Specification) that supports the SR-IOV capability and is accessible to an SR-PCIM, a VI, or an SI, and a Virtual Function (VF) which is a PCIe Function that is directly accessible by an SI.

In order to increase the effective hardware resource utilization without requiring hardware modifications, multiple Sis can be executed. Software termed a Virtualization Intermediary (VI) is interposed between the hardware and the SI. The VI takes sole ownership of the underlying hardware. Using a variety of methods outside of the scope of the standard, the VI abstracts the hardware to present each SI with its own virtual system. The actual hardware resources available to each SI can vary based on workload or customer-specific policies. While this approach works well for many environments, I/O intensive workloads can suffer significant performance degradation. Each I/O operation—inbound or outbound—must be intercepted and processed by the VI adding significant platform resource overhead.

To reduce platform resource overhead, PCI-SIG® developed SR-IOV technology having the following benefits: The ability to eliminate VI involvement in main data movement actions—DMA, Memory space access, interrupt processing, etc.; Elimination of VI interception and processing of each I/O operation can provide significant application and platform performance improvements; Standardized method to control SR-IOV resource configuration and management through Single Root PCI Manager (SR-PCIM); The ability to reduce the hardware requirements and associated cost with provisioning potentially a significant number of I/O Functions within a device; The ability to integrate SR-IOV with other I/O virtualization technologies such as Address Translation Services (ATS), Address Translation and Protection Table (ATPT) technologies, and interrupt remapping technologies to create a robust, complete I/O virtualization solutions.

For more information about SR-IOV please refer to the "Single Root I/O Virtualization and Sharing Specification Revision 1.0", herein incorporated by reference in its entirety.

The data center discovery and capability exchange protocol (DCBX) is used by Data Center Bridging (DCB) devices to exchange configuration information with directly connected peers. DCB devices have certain capabilities for supporting multiple traffic classes on a single switch/port. The DCBX protocol may also be used for misconfiguration detection and for configuration of the peer.

DCBX is used to determine the capabilities of the peer device. It is a means to know if the peer device supports a particular feature such as Priority Groups (PG) or Priority-based Flow Control (PFC). For example, it can be used to determine if two link peer devices support PFC. DCBX can be used to detect misconfiguration of a feature between the peers on a link. Misconfiguration detection is feature-specific because some features may allow asymmetric configuration. DCBX can be used by a device to perform configuration of DCB features in its link peer.

Each DCB feature has a set of parameters. DCB parameters are classified into two broad categories: Exchanged Parameters and Administered Parameters. Exchanged parameters are sent to the peer. Within the Exchanged parameter group, there are two sub-groups: Administered parameters and Operational Parameters. Administered parameters are the configured parameters. Operational parameters are associated with the operational state of the related administered parameter. Operational state might be different than the administrative/configured state, primarily as a result of the DCBX exchange with the peer. Operational parameters accompany those administered parameters where there is a possibility that the operational state is different from what was set by their administrator. The operational parameters may be included in the Link Layer Discovery Protocol (LLDP) message for informational purposes. It might be used by a device to know what is the current operational state of the peer. Local parameters are not exchanged in LLDP messages.

DCBX uses LLDP to exchange parameters between two link peers. LLDP is a unidirectional protocol. It advertises connectivity and management information about the local station to adjacent stations on the same IEEE 802 LAN.

DCBX is defined as a DCBX control state machine and a set of DCB feature state machines. The DCBX control state machine ensures that the two DCBX peers get in sync by exchanging LLDPDUs after link up or following a configuration change. The DCB feature state machines handle the local operational configuration for each feature by comparing and synchronizing with the peer's feature settings. The DCBX Control state machine uses a DCBX Control sub-TLV (Type Length Value) to exchange information with the peer. In addition, it maintains some additional local state variables to manage the state machine operation.

For more information about DCBX please refer to the "DCB Capability Exchange Protocol Base Specification, Rev. 1.01", herein incorporated by reference in its entirety.

SUMMARY OF THE INVENTION

In certain embodiments a method of managing network traffic classes in a virtualized computing platform is described. The capabilities of a network adapter (e.g. Single Root I/O Virtualization and Sharing adapter, etc.) are determined. The capabilities of the network and associated network switches are determined. One or more traffic classes are defined based on the shared capabilities of the network adapter and of the network and associated network switches. The one or more defined traffic classes are assigned to a partition within the virtualized computing platform. Packets (e.g. Link Layer Discovery Protocol (LLDP)) are routed based upon the LLDP information (e.g. Multicast Address, Ethertype Field, etc.) to a queue pair.

In another embodiment a virtualized computing platform for transferring commands to a network is described and includes a central processing unit (CPU), a memory connected to the CPU; a network and associated network switch attached to the CPU and memory; a trusted entity configured to manage the allocation of the CPU and memory to a partition; a network adapter connected between the network and the CPU and memory; a traffic class manager comprising a queue pair that maps system requirements designated by a virtualized computing platform manager and by the capabilities of the network switch onto the adapter. The traffic class manager receives packets routed to the queue pair based upon LLDP information.

In other embodiments the traffic class manager determines the network discovery and capability exchange features of the network and associated network switches.

In other embodiments the traffic class manager determines one or more network traffic classes based upon the capabilities of the adapter and upon the capabilities of the network and associated network switches.

In other embodiments the trusted entity further comprises a virtual interface queue pair (VIQP) to transmit and receive packets to or from the network utilizing an physical function or virtual function.

In other embodiments the traffic class manager enforces the assignment of the one or more traffic classes to the VIQP.

In other embodiments the traffic class manager is configured to accept ingress Link Layer Discovery Protocol (LLDP) Data Units (PDUs) and is configured to build and sends egress LLDP PDUs.

In other embodiments the traffic class manager implements a data center discovery and capability exchange protocol (DCBX) control state machine, is configured to parse ingress DCBX Type Length Value (TLV) by feature sub-TLV, and is configured to build egress DCBX TLVs.

In other embodiments the traffic class manager provides the DCBX feature state machine, manages a priority group configuration table, and manages a priority-based flow control structure.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
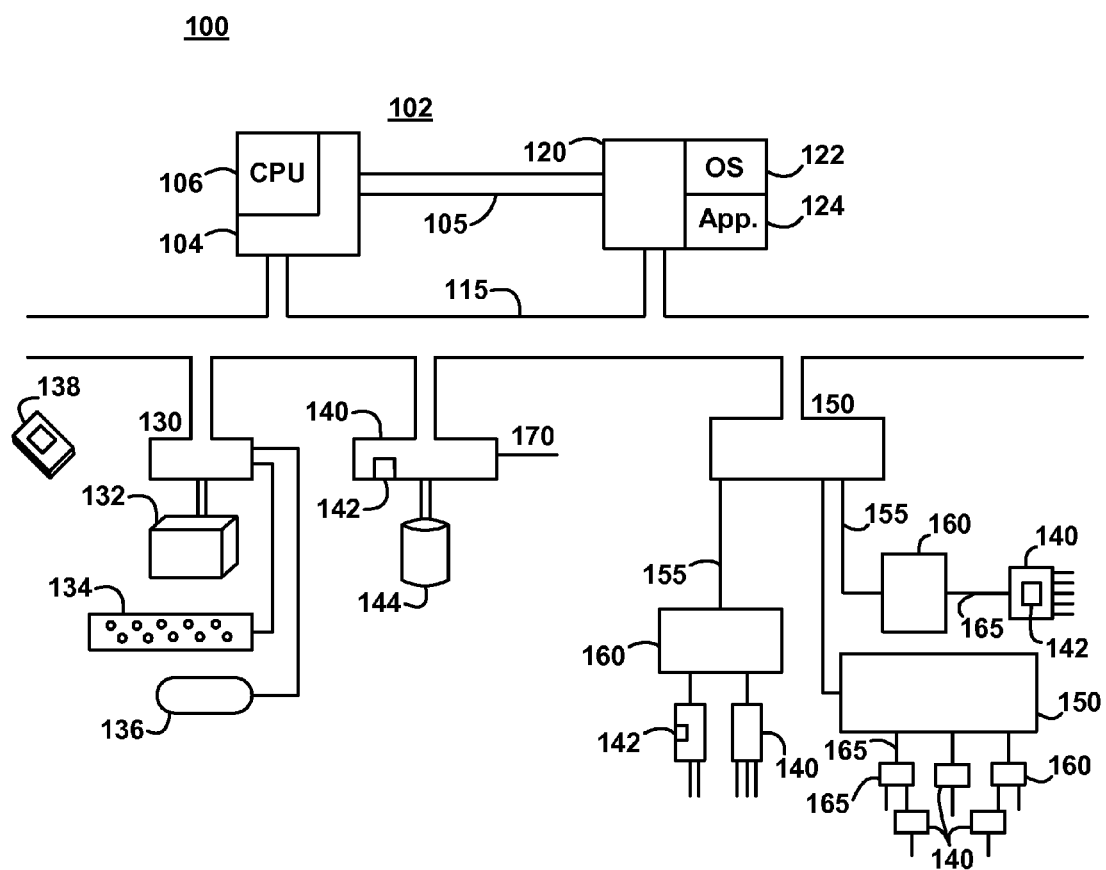
FIG. 1 depicts an exemplary computer system capable of utilizing an I/O adapter according to various embodiments of the present invention.

For a better understanding of the various embodiments of the present invention, together with other and further features and advantages thereof, reference is made to the following description, taken in conjunction with the accompanying drawings, and the scope of the invention asserted in the claims.

It will be readily understood that the components of the present invention, as generally described and illustrated in the Figs. herein, may be arranged and designed in a wide variety of different configurations. Thus, the following more detailed description of the embodiments of the apparatuses, systems, and methods of the present invention, as represented in FIGS. 1-7, are not intended to limit the scope of the invention, as claimed, but is merely representative of selected exemplary embodiments of the invention.

As will be appreciated by one skilled in the art, various embodiments of the present invention may be embodied as a system, apparatus, method, computer program product or any combination thereof. Accordingly, embodiments of the present invention may take the form of an entirely hardware embodiment, an entirely software embodiment (including firmware, resident software, micro-code, etc.) or an embodiment combining software and hardware aspects that may all generally be referred to, for example as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic or other such storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. In addition, features described in connection with a particular embodiment may be combined or excluded from other embodiments described herein.

Embodiments of the present invention are described below with reference to flowchart illustrations and/or block diagrams of methods, apparatus, design structure, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates the components and an interconnection topology for an information handling system, typically a computer system 100 that utilizes an adapter (storage adapter, network adapter, SR-IOV adapter, etc.) according to various embodiments of the present invention. Computer system 100 may comprise a host 102 having a host processor complex 104 connected to a main memory 120 by an internal bus 105 and/or a host system bus 115. The host processor complex 104 has at least one general-purpose programmable processor unit (CPU) 106, executing program instructions stored in main memory 120. Although a single CPU 106 is shown in FIG. 1, it should be understood that many processor complexes 104 have multiple CPUs 106.

Main memory 120 may be physically included within the host processor complex 104 or connected to it via an internal bus system 105 or via a host system bus 115. Memory 120 is a random access semiconductor memory for storing data and programs; memory 120 is shown conceptually as a single monolithic entity but in many computer systems 100, memory is arranged as a hierarchy of caches and other memory devices. In some instances, a hierarchy of cache memories is associated with each CPU 106. Memory 120 includes operating system (OS) 122 and applications 124. Operating system 122 provides functions such as device drivers or interfaces, management of memory pages, management of multiple tasks, etc. as is known in the art. Applications 124 may include a server software application in which case network interface 170 may interact with a server software application 124 to enable computer system 100 to be a network server.

Host system bus 115 supports the transfer of data, commands, and other information between the host processor system 102 and any peripheral or external device attached to it, and any communication of data which may occur between the external devices independent of the host processor complex 102. While shown in simplified form as a single bus, the host system bus 115 may be structured as multiple buses which may be hierarchically arranged. Host system bus 115 is illustrated as being connected to a myriad of external or peripheral devices either through a connection hub 130, or through an adapter 140, or a multifunction adapter 150, or directly to a network 170. These peripheral devices may include a monitor or display 132, a keyboard 134, a mouse or other handheld device 136, and a printer 138. Display 132 may be a cathode-ray tube display, a flat panel display, or a touch panel, and other display technology. One or more adapters 140 may support keyboard 134 and pointing device 136 depicted as a mouse; it being understood that other forms of input devices could be used. The number and types of devices shown in FIG. 1 are illustrative only and ordinary users of computer systems now know that a great variety of connected devices exist, e.g., microphones, speakers, infrared remote controls, wireless, etc. Computer system 100 is not limited to those devices illustrated in FIG. 1.

The host system bus 115 is also shown connected to an adapter 140 illustrated in FIG. 1 as an I/O adapter connected to an external memory device 144. External memory device 144 may be rotating magnetic disk storage, configuration. Adapter 140 includes adapter microcode or firmware and decision logic which may be embodied as a message processor 142. Adapters 140 may connect a wide variety of devices to the host computer system and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

The host system bus 115 may also be connected to a multifunction adapter 150 to which more I/O devices may be connected either directly, or through one or more bridge devices 160, or through another multifunction adapter 150 on either a primary bus 155 or a secondary bus 165.

The host system bus 115 is also shown connected to an adapter 140 illustrated in FIG. 1 as an I/O adapter connected to a communications network. Network interface 170 provides a physical connection for transmission of data to and from a network. The network may be Internet but could also be any smaller self-contained network such as an intranet, a WAN, a LAN, or other internal or external network using, e.g., telephone transmission lines, cable services, satellites, fiber optics, T1 lines, etc. and any various available technologies. Network interface 170 may comprise a modem connected to a telephone line through which an Internet access provider or on-line service provider is reached, but increasingly other higher bandwidth interfaces are implemented. For example, computer system 100 may be connected to another network server via a local area network using an Ethernet, Token Ring, or other protocol, or a second network server in turn being connected to the Internet. Alternatively, network interface 170 may be provided through cable television, fiber optics, satellites, wireless, or other connections.

Finally, computer system 100 need not be a computer at all, but may be a simpler appliance-like client device with less memory such as a network terminal, a thin client, a terminal-like devices, a voice response unit, etc. The convergence of computing, telecommunications and consumer electronics is causing a tremendous growth in the number and variety of pervasive mobile devices as clients. This mobile architecture enables the multitude of clients including laptops, sub-notebooks, handheld computers such as personal digital assistants and companion devices, and mobile appliances such as smartphones, pages, simple messaging devices and wearable devices. Thus when the computer system 100 is a mobile device, the adapters 140 and network interfaces 170 support a variety of multi-modal interfaces including traditional keyboard and mouse interfaces, small text screens, pen, touch screens, speech recognition, text-to-speech and other emerging technologies like wearable devices. Such special-purpose devices for accessing the world wide web, such as an Internet access box for a television set, or a portable wireless web accessing device, which can implement an adapter for the purpose of communicating data to/from another computer system are also intended to be within the scope of a computer system 100.

The computer system shown in FIG. 1 is intended to be a simplified representation, it being understood that many variations in system configuration are possible in addition to those specifically mentioned here. While computer system 100 could conceivably be a personal computer system, the computer system 100 may also be a larger computer system such as a general purpose server. Computer system 100 and its components are shown and described in FIG. 1 above as a more or less single, self-contained computer system. It is alternatively possible to use multiple computer systems, particularly multiple systems which share a single large database, each having a specialized task. References herein to a computer system 100 should be understood to include either a single computer or a collection of computer systems which provides access to a legacy application and to a network by which to connect to a client system.

The programs defining the functions of the various embodiments can be delivered to the computer system 100 and/or to the peripheral device for installation on a connected adapter via a variety of signal-bearing media, which include, but are not limited to: (a) information permanently stored on non-writable storage media, e.g., read only memory devices within either computer such as CD-ROM disks readable by CD-ROM; (b) alterable information stored on writable storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments.

In certain embodiments, when computer system 100 is programmed to perform particular functions pursuant to instructions from program software that implements the system and methods of this invention, such computer system 100 in effect becomes a special purpose computer particular to various methodology embodiments of this invention.

Figure 2:
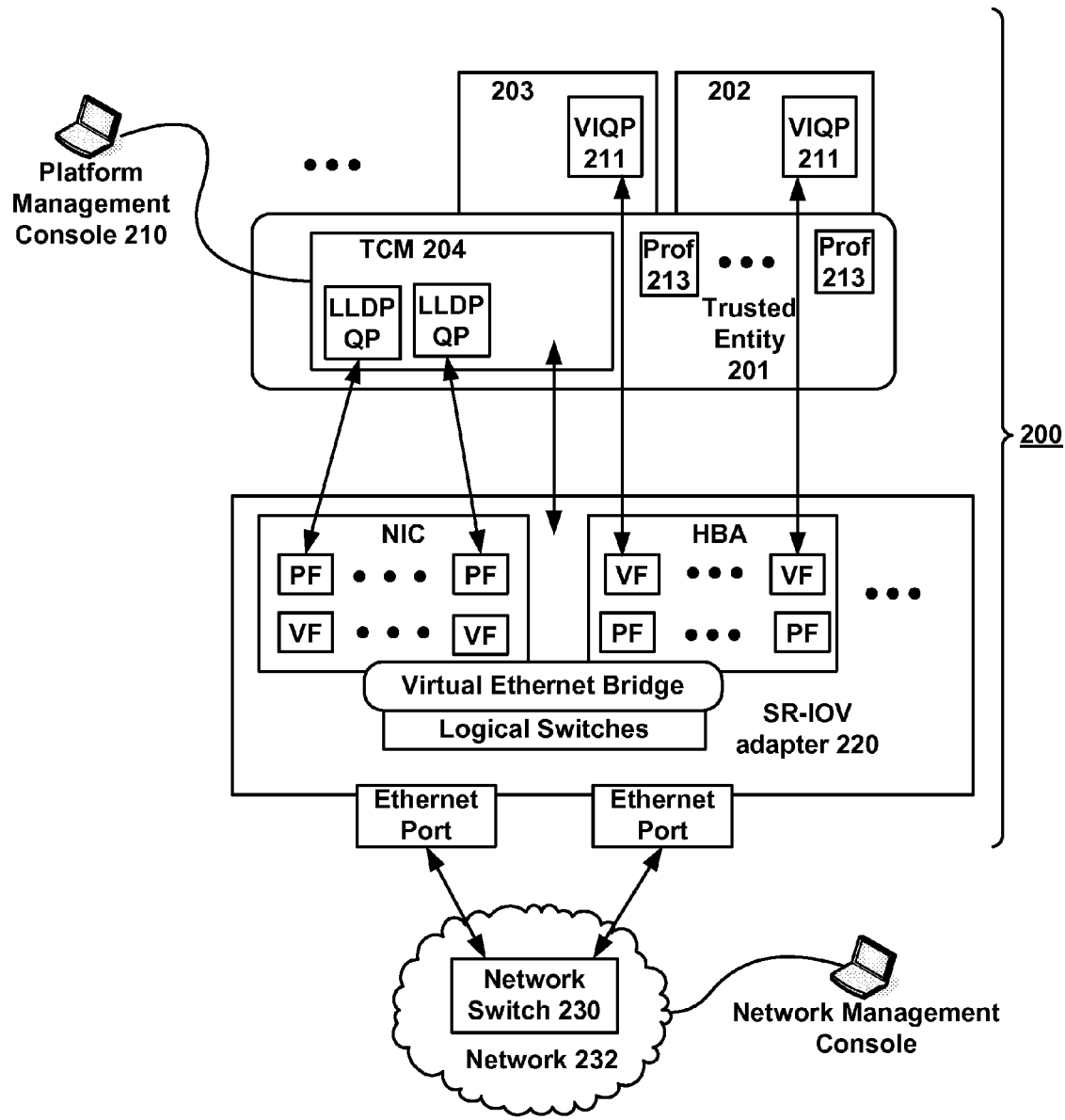
FIG. 2 depicts a virtualized computing platform that in various embodiments routes LLDP messages to/from a network from/to a Traffic Class Manager (TCM), according to various embodiments of the present invention.

FIG. 2 depicts a virtualized computing platform 200 that in various embodiments routes LLDP messages to or from a network 232 from or to a Traffic Class Manager (TCM) 204. Network 232 may in various embodiments be a data storage network or a communications network. Virtualized computing platform 200 may comprise the computing components shown in computer system 100 and may further comprises a plurality of partitions 202, 203, etc., a Virtual Interface Queue Pair (VIQP) 211, trusted entity 201, a Traffic Class Manager (TCM) 204, etc.

Virtualized computing platform 200 may also further comprise an adapter 220 that allows network 232 accesses and or egress to or from virtualized computing platform 200. A trusted entity 201 such as a hypervisor is interposed between the virtualized computing platform 200 hardware (i.e. processor 106, memory 120, etc.) and the plurality partitions. Trusted entity 201 is a component that manages the allocation of resources to a partition and isolates resource assigned to the partition from access by other partitions. In other words, trusted entity 201 may abstract the virtualized computing platform 200 hardware to present each partition with its own virtual computing system.

VIQP 211 is a queue pair (i.e. transmit queue and a receive queue) and provides a mechanism to transmit and receive packets over network 232 utilizing an SR-IOV a physical function or a virtual function.

TCM 204 is a resource within trusted entity 201 (i.e. a hypervisor, trusted partition, etc.) that maps requirements from platform management console 210 and those capabilities of network switch 230 onto the adapter 220. Both the resources of the adapter 220 and of the network switch 230 may then be appropriately allocated to platform partitions 202, 203, etc. TCM 204 defines network 232 traffic classes that meet the objectives of a platform administrator based on the capabilities of the adapter 220 and of the network switch 232 that is attached to the adapter ports. Once one or more of the traffic classes are defined, TCM 204 enforces the assignment of the one or more traffic classes to a partition's VIQP 211.

In certain embodiments TCM 204 may also comprise a Manager (LLDPM) function. The LLDPM function handles ingress LLDP Protocol Data Units (PDUs) and builds and sends egress LLDP PDUs. For ingress LLDP PDUs, the LLDPM function parses the LLDP PDU and distributes TLVs (Type Length Values) to type specific TLV handlers. A DCBX TLV is distributed to a DCBX TLV handler. For egress, the LLDPM function works with the TLV handlers to build and send LLDP PDUs.

In certain embodiments TCM 204 may also comprise a DCBX TLV Manager function. The DCBX TLV Manager function implements the DCBX control state machine, parses ingress DCBX TLV by feature sub-TLV, and works with the feature managers to build egress DCB TLVs.

In certain embodiments TCM 204 may also comprise a Priority Groups (PG) Manager function. The PG Manager function provides the DCB feature state machine and manages priority group configuration tables.

In certain embodiments TCM 204 may also comprise a Priority Flow Control Manager (PFCM) function. The PFCM function provides the DCB feature state machine and manages priority-based flow control structure.

TCM 204 interacts with Platform Management 210. TCM 204 provides the quality of service (QoS) capability of the adapter 220 to platform management 210. Platform management 210 may be for example a hardware management console (HMC), or other platform management scheme. Platform management 210 presents the adapter 220 QoS capabilities to a platform administer as standard QoS capabilities. Standard QoS capabilities may include such things as minimum network bandwidth required, maximum bandwidth allowed, weight to apply when vying for excess capacity, traffic type, etc. The traffic type includes InterProcess Communication (IPC), Fibre Channel over Ethernet (FcoE), general network traffic, etc. As the platform administrator defines a partition (for example partition 203), the platform administrator assigns the adapter VIQP 211 to the partition along with the desired QoS capabilities. This information may become part of a profile 213 of partition 203. The partition profile 213 is maintained by platform management 210 and is provided to the trusted entity 201 when the partition is activated. QoS capabilities are also assigned to the VIQP 211 when the VIQP 211 is dynamically assigned to an already active partition.

TCM 204 interacts with network switch 230. TCM 204 negotiates network QoS capabilities via the DCBX TLV in an LLDP PDU. In order for TCM 204 to interact with network switch 230, adapter 220 provides the capability to designate a virtual interface (PF or VF) as special with respect to how packets are handled. When an LLDP message or packet arrives at one of adapter 220 Ethernet ports, the packet is routed to the Queue Pair. The packet targets the Queue Pair based on the LLDP information such as LLDP multicast address or the LLDP Ethertype field. TCM 204 uses the same Queue Pair to advertise its capabilities to network switch 230.

TCM 204 implements the DCBX control state machine and DCB feature state machine on behalf of virtualized computing platform 200 and partitions (partitions 202, 203, etc.). TCM 204 also maintains the state variable which includes the local and peer parameters for the Priority Group, Priority-based Flow Control, and Application features.

When a partition is activated or when the VIQP 211 is dynamically assigned to a partition, the trusted entity 201 provides TCM 204 with profile information about the VIQP 211 the partition requires. TCM 204 examines the current allocation of resources to determine if the partition's requirements for shared adapter resources can be satisfied. For instance, TCM 204 can not satisfy a request if the partition can not be activated, or the VIQP 211 may not be assigned to an already active partition if the partition's VIQP 211 requirement for minimum bandwidth on a port causes the total of all partitions' virtual interfaces minimum bandwidth requirements to exceed 100% of the bandwidth. If the partition's requirements can be satisfied, TCM 204 assigns an appropriate traffic class to the virtual interface and indicates to the trusted entity 201 the partition can activate or the VIQP 211 can be dynamically assigned.

Figure 3:
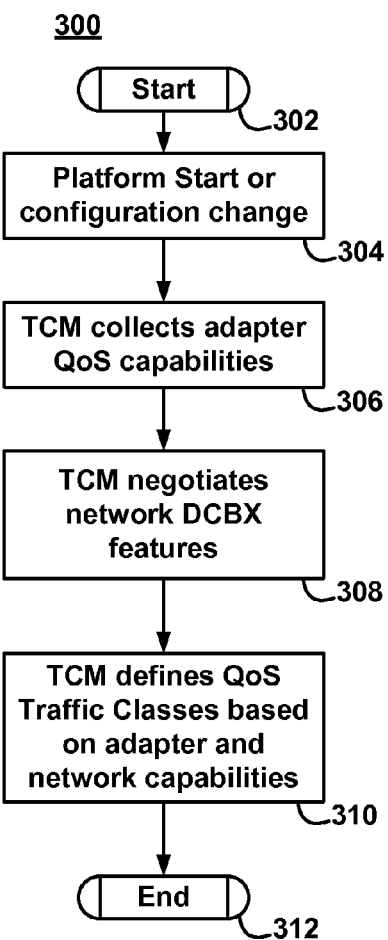
FIG. 3 depicts an exemplary method for the initialization or a configuration change of the virtualized computing platform, according to embodiments of the present invention.

FIG. 3 depicts an exemplary method 300 for the initialization or a configuration change of virtualized computing platform 200, according to embodiments of the present invention. Method 300 starts at block 302. The virtualized computing platform 200 starts or is otherwise initialized, or receives a configuration change command (block 304). TCM 204 collects adapter 220 QoS capabilities (block 306). TCM 204 receives or negotiates network 232 DCBX features (block 308) to determine network 232 capabilities. TCM 204 defines appropriate QoS traffic classes based upon shared adapter 220 QoS capabilities and network 232 capabilities (block 310). The exemplary method 300 for initialization or configuration change ends at block 312.

Figure 4:
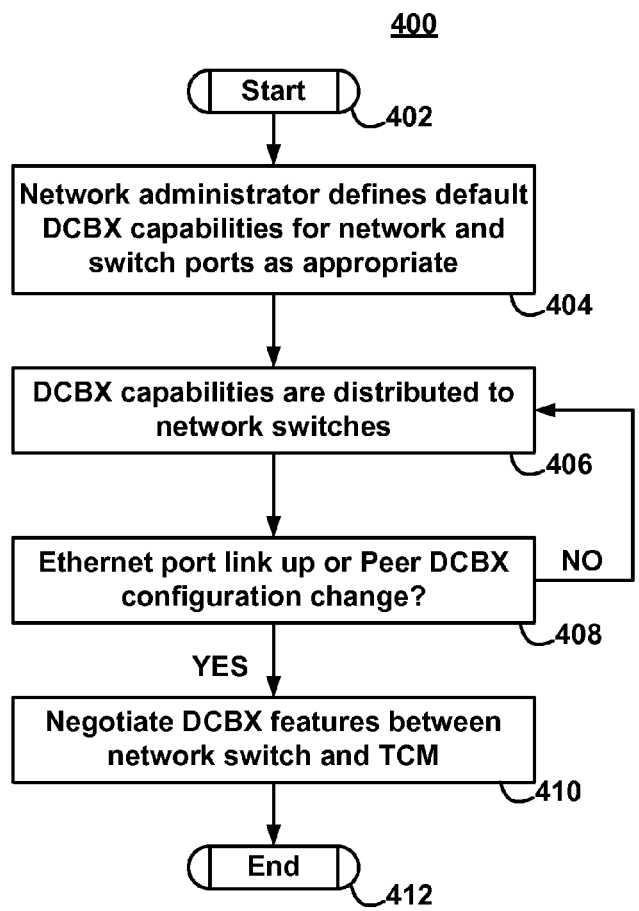
FIG. 4 depicts an exemplary method for the configuration of a network switch, according to embodiments of the present invention.

FIG. 4 depicts an exemplary method 400 for the configuration of network switch 230, according to embodiments of the present invention. Method 400 for the configuration of network switch 230 starts at block 402. A network administrator defines default DCBX capabilities for network 232 and network switch 230 as appropriate (block 404). Network 232 DCBX capabilities are distributed to network switches 230 (block 406). It is determined whether there has been an adapter 220 Ethernet port link-up (i.e. the Ethernet port is functional) or if the DCBX configuration of a peer has changed (block 408). A peer DCBX configuration change occurs when the feature state of the DCBX peer has changed. If there has been an adapter 220 Ethernet port link-up or if the DCBX configuration of a peer has changed, DCBX features are negotiated between network switch 230 and TCM 204. (block 410). If adapter link-up or configuration has not changed, network 232 DCBX capabilities may again be distributed to network switch 230. The exemplary method 400 for the configuration of network 232 ends at block 412.

Figure 5:
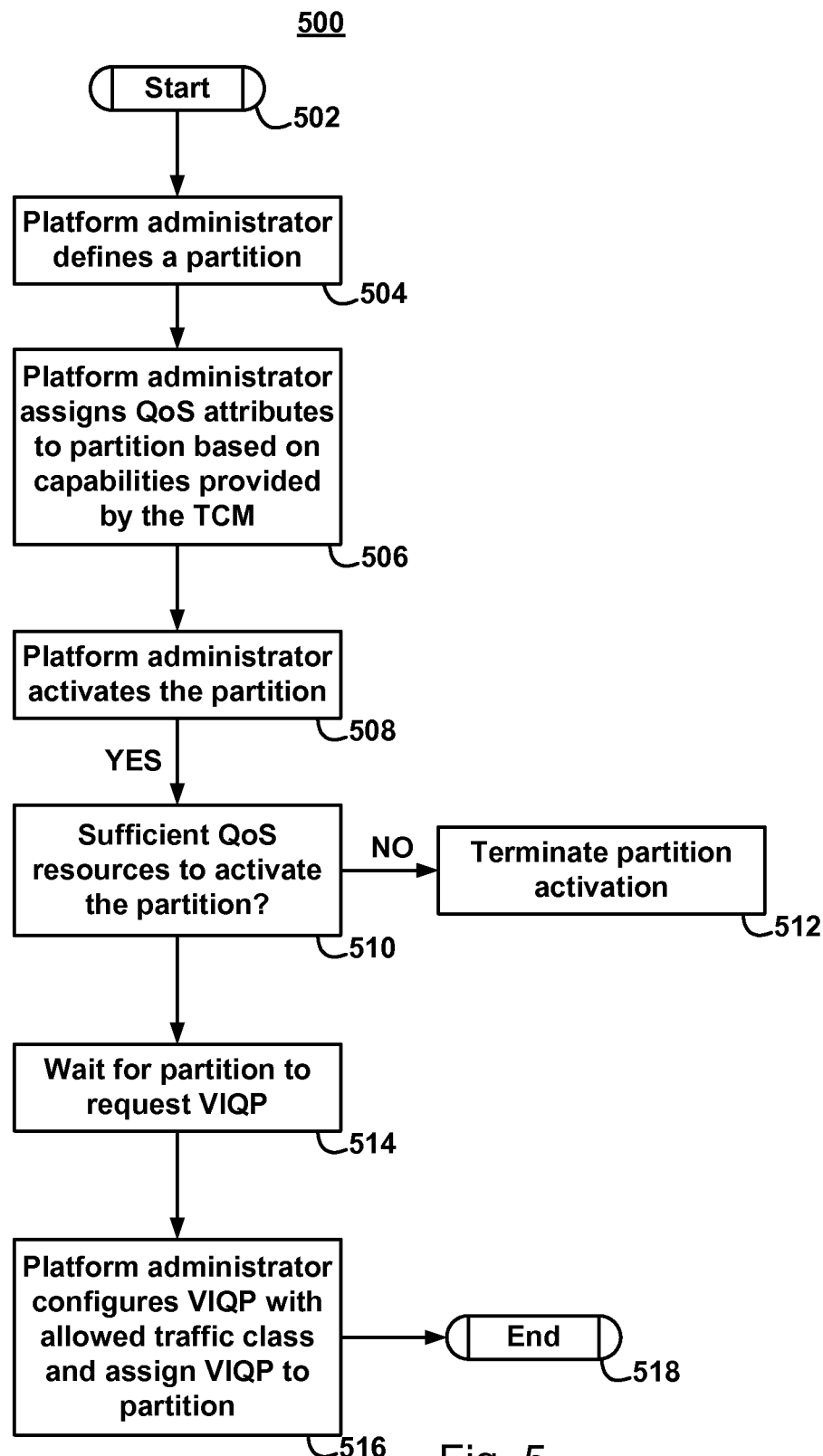
FIG. 5 depicts an exemplary method for the creation and activation of a partition, according to embodiments of the present invention.

FIG. 5 depicts an exemplary method 500 for the creation and activation of a partition, according to embodiments of the present invention. Method 500 for the creation and activation of a partition begins at block 502. A platform administrator defines a partition (block 504). The platform administrator assigns QoS attributes based upon QoS capabilities provided by TCM 204 (block 506). The platform administrator activates the partition (block 508). It is determined by TCM 204 whether there are sufficient QoS resources to activate the partition (block 510). If there are not sufficient QoS resources to activate the partition, the partition activation is terminated (block 512). If there are sufficient QoS resources to activate the partition and after the partition requests a VIQP 211 (block 514), the platform administrator configures VIQP 211 with the allowed traffic class and the VIQP is assigned to a partition (block 516). Method 500 for the creation and activation of a partition ends at block 518.

Figure 6:
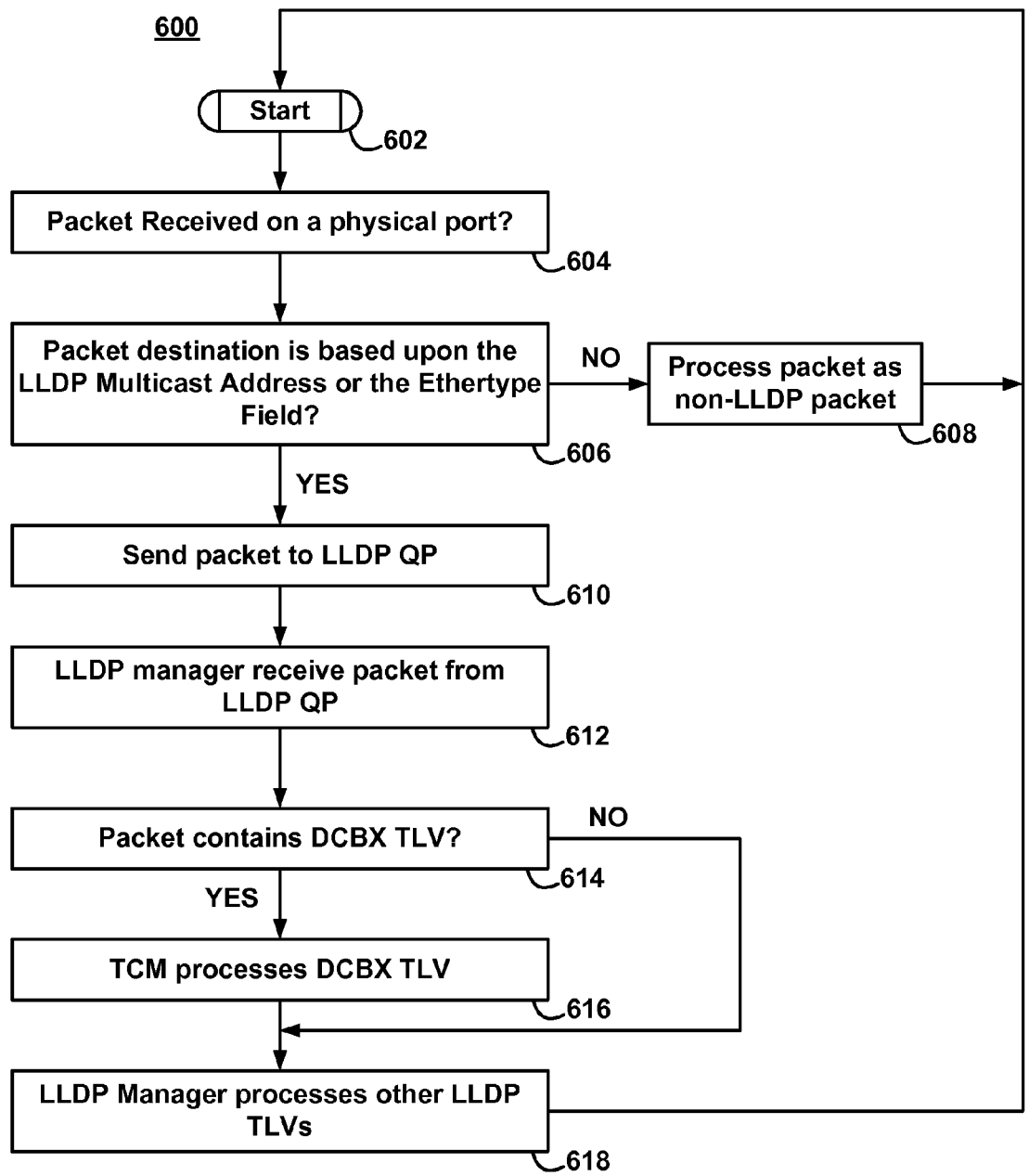
FIG. 6 depicts an exemplary method or flow of a received packet, according to embodiments of the present invention.

FIG. 6 depicts an exemplary method or flow 600 for a received Packet, according to embodiments of the present invention. Method or flow 600 for a received packet starts at block 602. A packet is received on a physical port of for example adapter 220 (block 604). It is determined whether the packet destination address is based upon LLDP information such as LLDP Multicast Address or a LLDP Ethertype (block 606). If it is determined whether the packet destination address is not based upon LLDP information such as LLDP Multicast Address or a LLDP Ethertype, the packet is processed as a non-Packet (block 608) and method 600 returns to block 602.

If it is determined that the packet destination address is based upon LLDP information such as LLDP Multicast Address or a LLDP Ethertype, the packet is sent to a QP (block 610). A Manager receives the packet from the QP (block 612). It is determined whether the packet contains a DCBX TLV (block 614). If the packet contains a DCBX TLV, TCM 204 processes the DCBX TLV (block 616). If the packet does not contain a DCBX TLV, or after the TCM 204 process the DCBX TLV, the Manager processes other LLDP TLVs (block 618) and method 600 returns to block 602.

Figure 7:
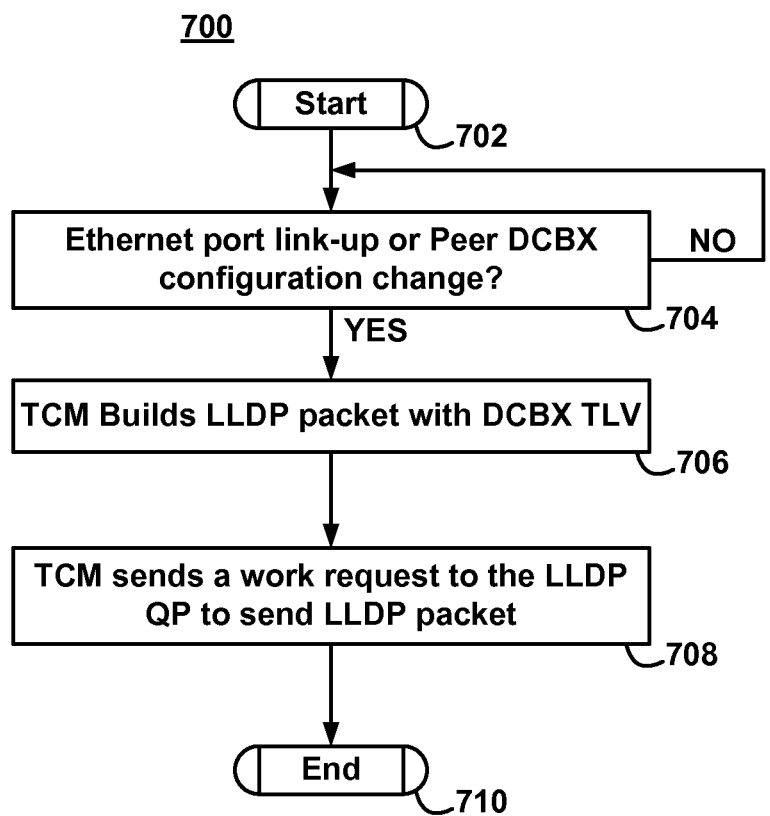
FIG. 7 depicts an exemplary method or flow for a transmitted packet, according to embodiments of the present invention.

FIG. 7 depicts an exemplary method or flow 700 for a transmitted Packet, according to embodiments of the present invention. Method or flow 700 begins at block 702. It is determined whether there has been a Ethernet port link-up or a peer DCBX configuration change (block 704). A peer DCBX configuration change occurs when the feature state of the DCBX peer has changed. If there has not been a Ethernet port link-up or a peer DCBX configuration change, method 700 returns to block 702. If there has been a Ethernet port link-up or peer DCBX configuration change, a Packet is built with a DCBX TLV by TCM 204 (block 706). TCM 204 send work request is placed on the QP to send the Packet (block 708). Method or flow 700 for a transmitted Packet ends at block 710.

It is to be understood that the present invention, in accordance with at least one present embodiment, includes elements that may be implemented on at least one electronic enclosure, such as general-purpose server running suitable software programs.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

The invention claimed is:

1. A method of assigning network traffic classes to at least one logical partition in a virtualized computing platform comprising:
    receiving packets from a network external to the virtualized computing platform at a network adaptor within the virtualized computing platform;
    routing the received packets to a traffic class manager in a trusted entity within the virtualized computing platform based upon a link layer discovery protocol (LLDP) identifier to determine capabilities of the network adaptor, the network, and at least one network switch associated with the network;
    defining one or more traffic classes based on capabilities shared among the network adapter, the network, and the at least one network switch;
    assigning the one or more defined traffic classes to the at least one logical partition within the virtualized computing platform.

2. The method of claim 1 wherein to determine capabilities of the network adaptor, the network and the at least one network switches further comprises:
    to determining network discovery and capability exchange features of the network adaptor, the network and the at least one network switches.

3. The method of claim 1 wherein assigning the one or more defined traffic classes to a partition within the virtualized computing platform further comprises:
    assigning the one or more defined traffic classes to a virtual interface queue pair (VIQP) within the partition.

4. The method of claim 1 wherein determining the capabilities of the network adapter further comprises:
    determining Quality of Service (QoS) capabilities of the network adapter.

5. The method of claim 4 further comprising:
    providing the QoS capabilities of the network adapter to a virtualized computing platform manager.

6. The method of claim 1 wherein assigning the one or more defined traffic classes to a partition within the virtualized computing platform further comprises:
    defining the partition within the virtualized computing platform; and
    assigning a virtual interface queue pair (VIQP) to the partition.

7. The method of claim 1 wherein defining one or more traffic classes based on shared capabilities of the network adapter, the network, and the associated network switches further comprises:
    designating either a physical function or a virtual function as a particular virtual interface.

8. The method of claim 1 wherein the link layer discovery protocol identifier is a link layer discovery protocol multicast address or an ethertype field.

9. A virtualized computing platform for assigning network traffic classes to at least one logical partition in the virtualized computing platform, the virtualized computing platform comprising:
    a central processing unit (CPU);
    a memory connected to the CPU;
    a trusted entity that manages the allocation of the CPU and memory to the at least one logical partition, the trusted entity comprises a traffic class manager; and
    a network adapter connected between a network external to the virtualized computing platform and the trusted entity, the network adapter receives packets from the network and routes the received packets to the traffic class manager based upon a link layer discovery protocol (LLDP) identifier to determine capabilities of the network adaptor, the network, and at least one network switch associated with the network, and the traffic class manager defines one or more traffic classes based on the capabilities shared among the network adaptor, the network, and the at least one network switch, and assigns the one or more traffic classes to the at least one logical partition.

10. The virtualized computing platform of claim 9 wherein the link layer discovery protocol identifier is a link layer discovery protocol multicast address or an ethertype field.

11. The method of claim 9 wherein the traffic class manager determines network discovery and capability exchange features of the network adaptor, the network and the at least one network switches.

12. The virtualized computing platform of claim 9 wherein the traffic class manager determines one or more network traffic classes based upon capabilities of the network adapter and upon capabilities of the network and associated network switches.

13. The virtualized computing platform of claim 9 wherein the trusted entity further comprises:

a virtual interface queue pair (VIQP) that transmits and receives packets to or from the network utilizing a physical function or a virtual function.

14. The virtualized computing platform of claim 13 wherein the virtualized computing platform manager assigns the VIQP to utilize the determined one or more network traffic classes.

15. The virtualized computing platform of claim 14 wherein the virtualized computing platform manager assigns the VIQP to a partition.

16. The virtualized computing platform of claim 15 wherein the traffic class manager enforces assignment of the one or more traffic classes to the VIQP.

17. The virtualized computing platform of claim 9 wherein the traffic class manager accepts ingress Link Layer Discovery Protocol (LLDP) data units and builds and sends egress LLDP data units.

18. The virtualized computing platform of claim 17 wherein the traffic class manager comprises a data center discovery and capability exchange protocol (DCBX) control state machine, parses ingress DCBX Type Length Values (TLV), and builds egress DCBX TLVs.

19. The virtualized computing platform of claim 18 wherein the traffic class manager manages a priority group configuration table and manages a priority-based flow control structure.

20. The virtualized computing platform of claim 9 wherein the network adapter is designates either a physical function or a virtual function as a particular virtual interface.

* * * * *